United States Patent Office 2,801,922
Patented Aug. 6, 1957

2,801,922

FROZEN CONFECTION

Sabin Oprean, New York, N. Y.

No Drawing. Application July 27, 1953,
Serial No. 370,599

9 Claims. (Cl. 99—137)

This invention relates to food products, more particularly to frozen confections, and to the making of the same, and is a continuation-in-part of my application filed May 25, 1951, Serial No. 228,154, now abandoned.

According to the invention, the new food product comprises a core of frozen confection, a cushioning edible sheath of resilient aerated gelatinous nature containing large quantities of discrete relatively insoluble gaseous particles or bubbles and an edible coating over the sheath. The construction of this resilient aerated gelatinous hot eating cushioning sheath in a frozen confection provides mechanical action which guides and controls the breaking of the outer coating layer of chocolate or other coating material where it is bitten into. This new and novel frozen confection is extremely palatable and healthful and can be produced in a wide variation of flavors in which the core is ice cream, water ice sherbet, milk sherbet, ice milk or the like, and the outer coating may be chocolate or other food composition suitable for a coating on frozen confections. The usual and best known frozen stick confection is the chocolate coated ice cream bar which consists of a core of hard frozen ice cream encased within a thin layer of high fat chocolate, or some other edible fat base binder or granular composition suitable for coating frozen confections.

These coatings on frozen confections are used for the purpose of retaining the shape of the frozen confections and to facilitate easier handling in packing, storing and shipping, and for eye appeal.

Frozen stick confections of previously known types have well-recognized disadvantages in that they drip easily and the chocolate coating cracks, chips, flakes, and slips off the ice cream bars in large pieces, creating unsightly and embarrassing situations.

An important disadvantage which has never been corrected in the manufacture of frozen stick confections, is the extreme cold shock to gums and teeth which is particularly harmful to growing youngsters who still have their baby teeth and to persons with cavities in their teeth or sensitive gums.

Due to the fact that the outer coating of previous frozen stick confections does crack, chip, flake and slip off the frozen core, the components never blend together and cannot be eaten as one and the taste of the coating is always the last taste which remains in the mouth when eating this type of frozen confection.

For these and other reasons experiments were conducted to replace the chocolate coating with other palatable coating materials, which resulted in the invention of U. S. Patent No. 2,191,352. The coating material in the aforesaid patent is very palatable, but in order to enable one to use it commercially, the coating must contain a very substantial amount of high bloom gelatine, the instant, rigid, smooth setting and drying of which is a very important factor in the manufacture of frozen confection of this type. The product of the said patent is a somewhat chewy and cold-eating piece.

The present invention represents a new and unique product as compared with Patent No. 2,191,352, and provides a product which is sufficiently soft and resilient to incorporate and hold in it large quantities of air (gas) without becoming glassy, rigid, or gummy, which is so balanced that when gas is incorporated therein, it will remain soft and semi-liquid at low temperatures and can be pumped through sanitary piping from one piece of equipment to another without clogging or setting, and which, with time and at below freezing temperatures, will set in its cast cushion position and will be "hot eating." When used to create a frozen confection, part of it will be frozen ice cream, frozen water ice, frozen sherbet, frozen ice milk, frozen fruit bar or the like, with its outer faces coated with chocolate or other suitable edible coating, but it will also have its own automatic mechanical action to control and guide the breaking of the outer layer of chocolate or other edible coating where bitten into and to hold firmly the remaining portion thereon, preventing cracking, flaking or slipping of said outer layer of coating material.

The present invention, which is the result of many years of research in the art of manufacturing of frozen confections, embodies the improvements and qualities which I have been seeking. The description of its various formulas or its combination with a frozen ice cream core or like frozen confectionery material cores and the making of same is intended as illustrative and not as limitative, the invention being defined by the appended claims.

The principal object of this invention is to produce a product which in combination does improve the eating qualities of frozen confections such as frozen ice cream bars, frozen sherbet bars, frozen ice milk bars, frozen water ice bars, frozen fruit bars, and the like.

Another object is to produce a product which can be used with the present day equipment available in frozen confectionery plants without setting in and clogging the sanitary piping and mixing equipment.

Still another object is to produce a product with stability and viscosity so balanced as to eliminate all crystallization in its liquid, semi-liquid and frozen state.

Still another object is to produce a product which does hold large quantities of air (gas) in its semi-liquid and in its frozen state and which will not collapse but stay in its cast cushion condition while being consumed, thus preventing leaking and dripping of ice cream and the like.

Still another object is to create and incorporate a hot eating cushioning material into a frozen coated confection, part of which may be frozen ice cream, etc., and the like, to eliminate the cold shock on teeth and gums heretofore encountered while eating frozen confections.

Still another object is to create a product so processed and employed as to form closely knitted numerous tender resilient aerated gelatinous bubbles and gelatinous suction-like cups which are cast with automatic machinery into a cushion surrounding a frozen core of ice cream, etc. between the core and the outer layer of chocolate or other coating, the said aerated cushion creating its own mechanical action to guide and control the breaking of the outer layer of chocolate or other edible coating where bitten into and to hold firmly the remaining portion thereon thus preventing cracking, flaking or slipping of said outer layer of coating material.

Still another object is to create a product, part of which is ice cream or the like, which by its balanced component materials and the air which is incorporated therein remains always soft and resilient at temperatures below freezing, and which, with its gelatinous cups, forms continuous firm, independent bonds on its outer face, binding itself to the inner phase of the chocolate coating and the like, and its inner gelatinous face forms a continuous soft resilient bond with the core of ice cream and the like.

Still another object is to create a frozen confection, part of which is ice cream and the like, having incorporated therein a food material which is always porous, soft, stable, sufficiently resilient, colored and flavored to absorb and blend the outer layer of chocolate coating and the like while masticating the frozen confection, thus eliminating separation regardless of the discrepancies of melting points of the combined product while eating.

In preparing my present invention, that is, the frozen confection which contains the hot eating aerated non-crystallizing jell cushion, I have found that when I use as flavors for the cushioning materials, such flavors as coffee, eggnog, vanilla, chocolate or any other of the non-acid-containing flavors, I get the best results by using in the colored and flavored water which is required to make this product, a gelatine having a Bloom gram strength from 75 to 100, and for the acid-containing flavors for the cushioning material, such as strawberry, raspberry, cherry, lemon and lime, orange, grape, pineapple, etc., a gelatine having a Bloom strength from 100 to 125. Should it be desirable to obtain a more free-flowing and softer material, I have found that this can be accomplished by adding to its total weight or volume a small amount of dehydrated egg albumen. If egg albumen is not available, a small amount of soya bean proteins can be substituted. Either material is helpful in increasing the capacities of the product to absorb and hold more air, therefore making it more porous, causing the product also to be more free-flowing during the processing operation resulting in a still softer and more porous cushioning material at very low temperatures.

I have also discovered that in order to avoid excess and undue rubberiness, hardening, crystallization, and shrinkage, it is desirable to incorporate a substantial amount of edible fats in the product. The presence of a proper amount of fat in this aerated jell cushioning material combined with proper amounts and proper Bloom gram strength of edible jellable stabilizer or emulsifier or emulsifier and stabilizer with or without egg albumen or other whipping aid and the proper amounts of sugar solids has been found to produce the desired end result. The product will always be stable and uniform in the form of a water phase emulsion, resilient and plastic in texture, free flowing and with further processing at given temperatures will be capable of holding as much as 150% of its displacement (volume) of air (gas), if so desired. Also, it can be pumped without loss of air from one piece of equipment to another from where it is injected automatically into the mold cavities.

The invention is exemplified by the following examples wherein proportions are by weight:

Example I

| | Percent |
|---|---|
| Sugar (sucrose or sucrose and dextrose) | 26.00 |
| Coconut oil refined | 27.00 |
| Gelatine (edible Bloom gram strength 75 to 125) | 1.35 |
| Water | 44.00 |
| Flavor, color and acid | 1.65 |
| | 100.00 |

Example II

| | Percent |
|---|---|
| Sugar (sucrose or sucrose and dextrose) | 26.00 |
| Coconut oil refined | 27.00 |
| Gelatine (Bloom gram strength 50 to 100) | 1.35 |
| Water | 44.00 |
| Flavor and color | 1.65 |
| | 100.00 |

These materials are compounded in their respective weights in a suitable steam jacketed kettle and kept under constant slow agitation at a temperature not less than 160° F., for the purpose of premixing and pasteurization for not less than thirty minutes. When the premixing and pasteurization are completed, the product then is colloidalized and chilled to a temperature ranging from 70° F. to 65° F., then pumped into a temporary sanitary holding tank from where it is pumped, as needed, into an ice cream freezer or other suitable mixing and whipping equipment for the purpose of additional chilling and for the purpose of incorporating therein 80% to 150% of air by volume but not for the purpose of freezing. The freezer or any other suitable mixing and whipping equipment is only kept sufficiently chilled to maintain the temperature of the product not lower than 40° F. to 50° F. When the desired quantities of air are incorporated therein the product then is ready to be used for the formation of the aerated jell cushion around ice cream or the like material into a frozen confection. Then the product is pumped into a suitable filling machine having two receiving hoppers, one for receiving the ice cream in a semi-frozen plastic form and the other hopper for receiving the jell cushioning material, with the air incorporated therein in its semi-liquid plastic form. The filling machine, which automatically dispenses through the double filling nozzles attached thereto, dispenses through its inner nozzle the ice cream or the like material and through its surrounding or other nozzle the jell cushioning material of given liquid quantities into the cavities of suitable molds used for the manufacture of frozen confections. Then into the combined product the sticks are inserted with the aid of a stick holder. The mold containing the combined product with the sticks therein is placed in a suitable brine tank having a temperature from −10° F. to −50° F., where the actual freezing takes place. When the combined products are totally solidified, they are released in the customary manner and then finally coated with chocolate or other suitable coating material. The production or combination of this frozen confection can also be accomplished with what is known in the trade as a double operation, whereby the ice cream or the like is solidified in a smaller mold cavity; then, after it is solidified, it is released in the customary manner and then inserted into a larger, partially filled mold cavity with the jell cushioning food material placed again in the brine tank where it is resolidified, released when solidified in the customary manner, then coated with chocolate or the like suitable coating. Should it be desired to produce a more free-flowing product with the capacity of holding more air (gas) and somewhat larger globules and still softer cushion at very low temperatures, the addition of powdered egg albumen has been found to be desirable.

The following formula with the addition of .20% of powdered egg albumen incorporated in the gelatine prior to mixing all the materials, then deducting its weight at the expense of the edible fat, has been found to be satisfactory:

Example III

| | Percent |
|---|---|
| Sugar | 26.00 |
| Oil | 26.80 |
| Gelatine (Bloom gram strength from 75 to 125) | 1.35 |
| Egg albumen | .20 |
| Water | 44.00 |
| Flavor and color | 1.65 |
| | 100.00 |

Should it be desired to produce a cushioning material with a pronounced chocolate flavor, color, acid and other flavors should be substituted with suitable cocoa powder or chocolate liquor. When this is done, the weight of other materials required to make this cushioning material should be adjusted to offset and adjust viscosity brought about by the addition of chocolate and its non-soluble solids and fat contained therein. For instance, cocoa powders, among other non-water soluble solids, contain from 3½% to 5% or more cocoa bean shell fiber and cocoa fat from about 8% to about 22%. In chocolate liquor, the fat content runs from about 45% to about 55%; therefore, the vegetable fat should be adjusted so that the total edible fat content should not exceed the desired total quantities. I have found it very desirable to reduce the total fat content of the chocolate flavored cushioning material and replace it with water; the product is still more liquid and will hold somewhat larger quantities of air.

In using chocolate liquor or cocoa powder as flavoring, the following formulas have been found to be satisfactory:

Example IV

| | Percent |
|---|---|
| Water | 45.65 |
| Vegetable fat | 16.00 |
| Sugar (sucrose or sucrose and dextrose) | 26.00 |
| Chocolate liquor | 11.00 |
| Emulsifier | 1.35 |
| | 100.00 |

Example V

| | Percent |
|---|---|
| Water | 45.65 |
| Vegetable fat | 20.00 |
| Sugar (sucrose or sucrose and dextrose) | 26.00 |
| Cocoa powder | 7.00 |
| Gelatine | 1.35 |
| | 100.00 |

It will be understood, of course, that the end result of this invention is a product which is very sticky and tender in form as placed into a frozen confection as herein described in an aerated cushion form around and between a frozen core of ice cream and the like, and the outer layer of chocolate or the like coating, and that the above proportions and kind of edible glyceride may be varied to produce a cushioning material of exact viscosity and all the other characteristics desired, combined with and made part of various types of frozen confections. It is preferred to use refined coconut oil as a vegetable fat. Various other edible glycerides such as cottonseed oil, peanut oil, corn oil, butter, palm oil or other fats and oils can be used as edible fats hereinabove specified. Also, various other edible jellable emulsifiers and/or stabilizers in various proportions and of various Bloom gram strength can be used to achieve the same end result, such as Irish moss or Irish moss extract, cellulose gum, locust bean gum, gum arabic or other gums, gelatine, Bloom gram strength from 25 to 400, sodium alginate, and other edible jellable emulsifiers or stabilizers.

Before the selection of a replacement is made for gelatine and its Bloom gram strength with other emulsifying agent, stabilizer or a combination of emulsifiers and stabilizers, or before a decision is made to add to one or another additional whipping aid or agent, each material so selected for use should be tested separately and thoroughly, its properties as to jell strength, acidity, viscosity, melting point, etc., should be as closely matched as possible to the emulsifying agent hereinabove specified.

I have obtained the same end results with various kinds of emulsifiers of various strengths. Egg albumen, soya protein or other slightly gelatinous whipping agent may also be used as an emulsifier with or without the aid of a more gelatinous emulsifier.

It should be clearly understood that this invention is not a coating material. It cannot be used as a coating for frozen confections and cannot be used without the protection and aid of a chocolate or the like outer edible coating. It is a very soft sticky, mushy material in its semi-liquid and set form; it contains large quantities of air and because of its character and the method of manufacture into a frozen confection, part of it which is ice cream or the like, variation in the nature of the ingredients and other factors would require that the range of proportions of the ingredients be given as follows:

Example VI

| | | |
|---|---|---|
| Sugars | from about | 20% to about 36% |
| Edible fats or oils | from about | 20% to about 33% |
| Stabilizer (Bloom gram strength 50 to 400) | from about | ¼% to about 3% |
| Egg albumen, soya protein or other whipping aid or agent | from about | 0.20% to about 1% |
| Water | from about | 33% to about 65% |
| Any total | | 100% |

The large quantities of air contained in the cushioning part of the frozen confection are held there in the cups and globules of the gelatinous part of the water phase emulsion created during the whipping, releasing and dipping process. This air cannot be solidified nor completely frozen under the temperatures in which this frozen confection is manufactured and held in storage. The air in the cups and globules composes one-half to one and one-half of the total liquid displacement of the cushioning material and maintains the same temperature and density attained during the process of manufacturing the cushioning material. The trapped air plays an extremely important part in this invention.

The air in the interlocking soft and resilient, slightly gelatinous cups and globules is responsible for this frozen confection, part of which is ice cream or the like coated with chocolate or the like suitable coating, being hot eating. Air will, with change of temperature, contract or expand to a sufficient degree to keep this slightly gelatinous cushioning material tender and resilient at below freezing temperatures and because the air is locked into a reasonably large size protective sweetened slightly gelatinous tender resilient bubble, it cannot be frozen. Its degree of heat is always higher than that of the materials surrounding it. The composition and the construction of my new frozen confection give it its novel distinctive qualities and ability to construct its firm interlocking and holding suction cups during the process of its release from the mold cavities and dipping it into the hot chocolate or the like coating. Also it gives its novel and distinctive ability to hold and control the breaking point of the cholocate or the like coating where it is bitten into and because of the softness and tender aerated resiliency, it will blend in the mouth while masticating, with the outer layer of coating or the like material and ice cream, etc., and eat as one.

I claim:

1. A food product comprising a core of frozen confection, a cushioning edible sheath surrounding said core and an edible coating over the sheath, said sheath containing a substantially stable emulsion of a solution of an edible gelatinous substance in an edible solvent through which sheath large quantities of discrete relatively insoluble gaseous air particles are dispersed forming aerated gelatinous bubbles and suction-like cups, the cushioning edible sheath being in a substantially fixed state on the core between the core and the edible coating while the gaseous air particles retain their discrete and dispersed state.

2. A food product according to claim 1, in which the edible gelatinous substance is a material selected from the group consisting of gelatine, Irish moss, Irish moss extract, cellulose gum, locust bean gum and gum arabic and mixtures thereof.

3. A food product according to claim 2, in which the edible gelatinous substance is gelatine.

4. A food product according to claim 1, in which the bubbles have a total volume of approximately 50–150% of the volume of the solution.

5. A food product according to claim 1, in which the bubbles have a total volume approximately equal to the volume of the solution.

6. A food product according to claim 1, in which the solution is a water solution and contains, in addition to the edible gelatinous substance, sugar and an edible fatty substance.

7. A food product according to claim 6, in which the edible fatty substance is selected from the group consisting of coconut oil, cottonseed oil, peanut oil, corn oil, butter and palm oil.

8. A food product according to claim 7, in which the edible fatty substance is coconut oil.

9. A food product according to claim 6, in which the solution also contains a binder selected from the group consisting of egg albumen and soya protein.

References Cited in the file of this patent

UNITED STATES PATENTS

| | | |
|---|---|---|
| 2,085,495 | Fulkerson | June 29, 1937 |
| 2,133,586 | Stanger et al. | Oct. 18, 1938 |
| 2,191,352 | Oprean | Feb. 20, 1940 |